US011225997B2

(12) United States Patent
Estrada et al.

(10) Patent No.: US 11,225,997 B2
(45) Date of Patent: Jan. 18, 2022

(54) CABLE END FITTING AND CABLE ABUTMENT AND METHOD OF SECUREMENT

(71) Applicant: Inteva Products, LLC, Troy, MI (US)

(72) Inventors: Oscar Omar Estrada, Cd. Juarez Chih. (MX); Fernando Chacon, Cd. Juarez Chih (MX); Hector Sanchez, Cd. Juarez Chih. (MX); Donald M. Perkins, Sterling Heights, MI (US); Carlos Tostado, Cd. Juarez Chih. (MX)

(73) Assignee: INTEVA PRODUCTS, LLC, Troy, MI (US)

( * ) Notice: Subject to any disclaimer, the term of this patent is extended or adjusted under 35 U.S.C. 154(b) by 21 days.

(21) Appl. No.: 16/591,386

(22) Filed: Oct. 2, 2019

(65) Prior Publication Data

US 2020/0032836 A1    Jan. 30, 2020

Related U.S. Application Data

(62) Division of application No. 15/336,000, filed on Oct. 27, 2016, now Pat. No. 10,465,742.

(Continued)

(51) Int. Cl.
*F16C 1/26*       (2006.01)
*E05B 79/20*      (2014.01)

(52) U.S. Cl.
CPC .............. *F16C 1/262* (2013.01); *E05B 79/20* (2013.01); *Y10T 29/4987* (2015.01);

(Continued)

(58) Field of Classification Search
CPC ...... F16C 1/262; F16C 2350/52; F16C 1/102; H02G 3/0625; Y10T 29/49826;

(Continued)

(56) References Cited

U.S. PATENT DOCUMENTS 3,101,205  A    8/1963  Benham
3,139,768  A    7/1964  Biesecker (Continued)

FOREIGN PATENT DOCUMENTS

CN    101124501 A    2/2008
CN    102195195 A    9/2011

(Continued)

OTHER PUBLICATIONS

English Machine Translation for JPH0286930.

(Continued)

*Primary Examiner* — Saran G Afzali
*Assistant Examiner* — Darrell C Ford
(74) *Attorney, Agent, or Firm* — Cantor Colburn LLP

(57) ABSTRACT

A cable conduit end for securing a cable to a cable abutment of a latch is provided. The cable conduit end having: a housing; an alignment feature incorporated into a surface of the housing; a flexible retention feature integrally formed with the conduit end, wherein the flexible retention feature is spring biased away from the housing to a first position; and a radial retention feature extending outwardly away from the housing, wherein the flexible retention feature is located proximate to a first end of the housing and the radial retention feature is located proximate to a second end of the housing.

12 Claims, 4 Drawing Sheets

Related U.S. Application Data

(60) Provisional application No. 62/248,000, filed on Oct. 29, 2015.

(52) U.S. Cl.
CPC .... *Y10T 29/49813* (2015.01); *Y10T 29/49826* (2015.01); *Y10T 29/49863* (2015.01); *Y10T 29/49876* (2015.01); *Y10T 29/49908* (2015.01)

(58) Field of Classification Search
CPC .......... Y10T 29/49863; Y10T 29/4987; Y10T 29/49876; Y10T 29/49813; Y10T 29/49908; E05B 79/20
USPC .................. 29/428, 453, 446, 450, 505, 425
See application file for complete search history.

(56) References Cited

U.S. PATENT DOCUMENTS

| | | | |
|---|---|---|---|
| 3,285,551 | A | 11/1966 | Tschanz |
| 3,380,318 | A | 4/1968 | Henning |
| 3,905,672 | A | 9/1975 | Anhalt et al. |
| RE30,850 | E | 1/1982 | Gordy et al. |
| 4,643,042 | A | 2/1987 | Swoveland |
| 4,747,656 | A * | 5/1988 | Miyahara ............. G02B 6/3855 385/75 |
| 4,917,418 | A | 4/1990 | Gokee |
| 5,136,672 | A * | 8/1992 | Mulholland ......... G02B 6/3849 385/53 |
| 5,394,497 | A * | 2/1995 | Erdman ............... G02B 6/3855 385/78 |
| 5,765,959 | A | 6/1998 | Shioda |
| 6,179,639 | B1 * | 1/2001 | Kuwahara .......... H01R 13/6277 439/282 |
| 6,340,265 | B1 | 1/2002 | Suzuki et al. |
| 6,727,287 | B2 | 4/2004 | Wu et al. |
| 6,835,083 | B1 | 12/2004 | Alacqua et al. |
| 7,225,702 | B2 | 6/2007 | Fannon et al. |
| 7,824,110 | B2 | 11/2010 | Rosenberger et al. |
| 8,727,287 | B2 * | 5/2014 | Trouve ................... F16C 1/265 248/56 |
| 8,860,889 | B2 * | 10/2014 | Choi ...................... H01R 24/76 348/730 |
| 9,472,890 | B2 * | 10/2016 | Arai .................. H01R 13/5205 |
| 10,873,164 | B2 * | 12/2020 | Fuchs ..................... H01R 13/72 |
| 10,920,820 | B2 * | 2/2021 | Ficyk ..................... E05B 79/20 |
| 10,920,821 | B2 * | 2/2021 | Imai ........................ F16C 1/262 |
| 11,025,009 | B2 * | 6/2021 | Shimonishi ............ H01R 12/57 |
| 11,081,829 | B2 * | 8/2021 | Ikeya ...................... H01R 13/52 |
| 2004/0129105 | A1 | 7/2004 | Gordy et al. |
| 2008/0248680 | A1 * | 10/2008 | Stoner .................. H01R 13/633 439/357 |
| 2009/0263086 | A1 | 10/2009 | Rosenberger et al. |
| 2010/0183265 | A1 * | 7/2010 | Barnes .................... G02B 6/245 385/77 |
| 2011/0020093 | A1 | 1/2011 | Busch et al. |
| 2012/0301087 | A1 * | 11/2012 | Cunningham ....... H01R 13/465 385/78 |
| 2013/0087007 | A1 | 4/2013 | Joly |
| 2013/0209043 | A1 * | 8/2013 | Norris .................. G02B 6/3887 385/80 |
| 2014/0064664 | A1 * | 3/2014 | Anderson ............ G02B 6/3604 385/58 |
| 2014/0226936 | A1 * | 8/2014 | Sun ...................... G02B 6/3887 385/81 |
| 2014/0376865 | A1 * | 12/2014 | Bhagavatula ........ G02B 6/3817 385/93 |
| 2015/0155645 | A1 * | 6/2015 | Hara ...................... H01R 12/75 439/345 |
| 2015/0298623 | A1 | 10/2015 | Kato et al. |
| 2017/0122355 | A1 | 5/2017 | Estrada et al. |
| 2021/0072485 | A1 * | 3/2021 | Lu ........................ G02B 6/4472 |
| 2021/0180362 | A1 * | 6/2021 | Holcomb, II ......... E05B 15/006 |

FOREIGN PATENT DOCUMENTS

| | | |
|---|---|---|
| CN | 202206079 U | 4/2012 |
| CN | 103250313 A | 8/2013 |
| CN | 104428571 A | 3/2015 |
| CN | 104487340 A | 4/2015 |
| JP | H0286930 A | 3/1990 |
| JP | 2651398 B2 | 6/1993 |

OTHER PUBLICATIONS

CN Office Action dated Sep. 29, 2019 for Application No. 201610958128.8.
English Translation to CN Office Action dated Sep. 29, 2019 for Application No. 201610958128.8.
English Machine Translation to Abstract CN202206079.
English Machine Translation to Abstract Abstract JPH05144499 (equiv. to JP2651398).
English Machine Translation to Abstract CN104487340.
English Machine Translation to Abstract CN103250313.
English Machine Translation to Abstract CN104428571.
English Machine Translation to Abstract CN102195195.
CN Office Action dated Jul. 3, 2020 for Application No. 201610958128.8.
English Translation CN Office Action dated Jul. 3, 2020 for Application No. 201610958128.8.

* cited by examiner

CABLE END FITTING AND CABLE ABUTMENT AND METHOD OF SECUREMENT

CROSS REFERENCE TO RELATED APPLICATIONS

This application is a divisional of U.S. patent application Ser. No. 15/336,000 filed on Oct. 27, 2016, now U.S. Pat. No. 10,465,742, which claims the benefit of U.S. Provisional Application Ser. No. 62/248,000 filed on Oct. 29, 2015 the contents each of which are incorporated herein by reference thereto.

BACKGROUND

Exemplary embodiments of the present invention relate generally to latch mechanisms and, more particularly, to end fittings for cables in latch mechanisms.

Conventional latch mechanisms may include multiple cables, each coupled to a lever for carrying out various functions, such as locking and releasing the latch for example. Often, these cables have to be connected to the interior of the latch, accessible by only a small opening through which the cable is inserted. In addition, other components of the latch, such as the door trim fixing plug, may interfere with the positioning of the cable as it is inserted into the latch. This can make the assembly process difficult, time consuming, costly and prone to error. It is also difficult to disassemble the cable connection for maintenance without damaging the cable, the cable fitting or the latch.

When using a cable assembly to release a door latch, either from inside or outside handle, it is desirable that the sleeve, or conduit, that the cable is guided by be anchored robustly at each end so as to avoid inadvertent disengagement that would render the cable inoperable. It is also desirable that this anchor mechanism, between the cable conduit end and the housing or bracket that it is retained by, be capable of being installed through a minimal amount of force, for ergonomic reasoning, and be able to withstand a high disengagement force per the aforementioned reasoning.

Accordingly, it is desirable to provide a cable abutment and complimentary cable end that provides a quick and efficient means for securing a cable conduit to a portion of a latch being operated by the cable.

SUMMARY OF THE INVENTION

In one embodiment, a cable conduit end for securing a cable to a cable abutment of a latch is provided. The cable conduit end having: a housing; an alignment feature incorporated into a surface of the housing; a flexible retention feature integrally formed with the conduit end, wherein the flexible retention feature is spring biased away from the housing to a first position; and a radial retention feature extending outwardly away from the housing, wherein the flexible retention feature is located proximate to a first end of the housing and the radial retention feature is located proximate to a second end of the housing.

In addition to one or more of the features described above, or as an alternative to any of the foregoing embodiments, the cable conduit end may further include a cable extending through an opening in the cable conduit end.

In addition to one or more of the features described above, or as an alternative to any of the foregoing embodiments, the cable conduit end may further include a cable sheath extending over a portion of the cable and secured to the second end of the housing.

In addition to one or more of the features described above, or as an alternative to any of the foregoing embodiments, the cable conduit end may further include a cable sheath extending over a portion of the cable and secured to the second end of the housing.

In addition to one or more of the features described above, or as an alternative to any of the foregoing embodiments, the flexible retention feature may be formed from a resilient material.

In addition to one or more of the features described above, or as an alternative to any of the foregoing embodiments, the flexible retention feature may be formed from plastic.

In addition to one or more of the features described above, or as an alternative to any of the foregoing embodiments, the radial retention feature may be a pair of radial retention features.

In addition to one or more of the features described above, or as an alternative to any of the foregoing embodiments, the flexible feature may be a pair of flexible retention features.

In addition to one or more of the features described above, or as an alternative to any of the foregoing embodiments, the flexible feature may be a pair of flexible retention features.

In addition to one or more of the features described above, or as an alternative to any of the foregoing embodiments, the alignment feature may have angled surfaces.

In another embodiment the combination of a cable conduit end and a cable abutment of a latch housing is provided. The cable conduit end being configured to secure the cable to the cable abutment and the cable conduit end having: a housing; an alignment feature incorporated into a surface of the housing; a flexible retention feature integrally formed with the conduit end, wherein the flexible retention feature is spring biased away from the housing to a first position; and a radial retention feature extending outwardly away from the housing, wherein the flexible retention feature is located proximate to a first end of the housing and the radial retention feature is located proximate to a second end of the housing; and wherein the cable abutment has an opening configured to slidably received the cable conduit end therein.

In addition to one or more of the features described above, or as an alternative to any of the foregoing embodiments, the cable conduit end may be configured to snap-fittingly engage the opening of the cable abutment.

In addition to one or more of the features described above, or as an alternative to any of the foregoing embodiments, a distal end of the flexible retention feature engages a retaining feature located in the opening of the cable abutment when the cable conduit end is inserted into the housing.

In addition to one or more of the features described above, or as an alternative to any of the foregoing embodiments, the radial retention feature engages a feature of the cable abutment when the cable conduit end is inserted into the housing.

In addition to one or more of the features described above, or as an alternative to any of the foregoing embodiments, a distal end of the flexible retention feature engages a retaining feature located in the opening of the cable abutment when the cable conduit end is inserted into the housing and wherein the flexible retention feature prevents the cable conduit end from being removed from the housing after it has snap fittingly engages the housing and wherein the radial retention feature engages a feature of the cable abutment when the when the cable conduit end is inserted into the housing.

In addition to one or more of the features described above, or as an alternative to any of the foregoing embodiments, the radial retention feature prevents radial movement of the cable conduit end when the cable conduit end is inserted into the housing.

In addition to one or more of the features described above, or as an alternative to any of the foregoing embodiments, the radial retention feature is a pair of radial retention features and wherein the flexible feature is a pair of flexible retention features.

In addition to one or more of the features described above, or as an alternative to any of the foregoing embodiments, the alignment feature is received within a pair of features located in the housing.

In addition to one or more of the features described above, or as an alternative to any of the foregoing embodiments, the alignment feature has angled surfaces configured to guide the alignment feature into an opening between the pair of features when the cable conduit end is inserted into the housing.

In yet another embodiment, a method of securing a cable conduit end to a cable abutment of a latch housing is provided. The method including the steps of: inserting a housing of the cable conduit end into an opening of the cable abutment; guiding an alignment feature incorporated into a surface of the housing between a pair of features located in the opening of the cable abutment; deflecting a pair of flexible retention features integrally formed with the conduit end towards the housing of the cable conduit end as it is inserted into the cable abutment; engaging a pair of retention features of the cable abutment with a distal end of the pair of flexible retention features after they have been deflected towards the housing and then returned to a first position, wherein the pair of flexible retention features are spring biased away from the housing to the first position; and engaging a pair of features of the cable abutment with a pair of radial retention features extending outwardly away from the housing, wherein the pair of flexible retention features are located proximate to a first end of the housing and the pair of radial retention features are located proximate to a second end of the housing.

The above-described and other features and advantages of the present invention will be appreciated and understood by those skilled in the art from the following detailed description, drawings, and appended claims.

BRIEF DESCRIPTION OF THE DRAWINGS

Embodiments of the present invention will now be described, by way of example only, with reference to the accompanying drawings in which.

DETAILED DESCRIPTION

Various embodiments of the present invention are directed to a cable abutment configured for a snap-in design wherein once secured, the cable abutment withstands axial and/or radial forces removal forces. The cable abutment is configured to have a low insertion force as compared to the higher removal forces it is capable of withstanding.

Figure 1:
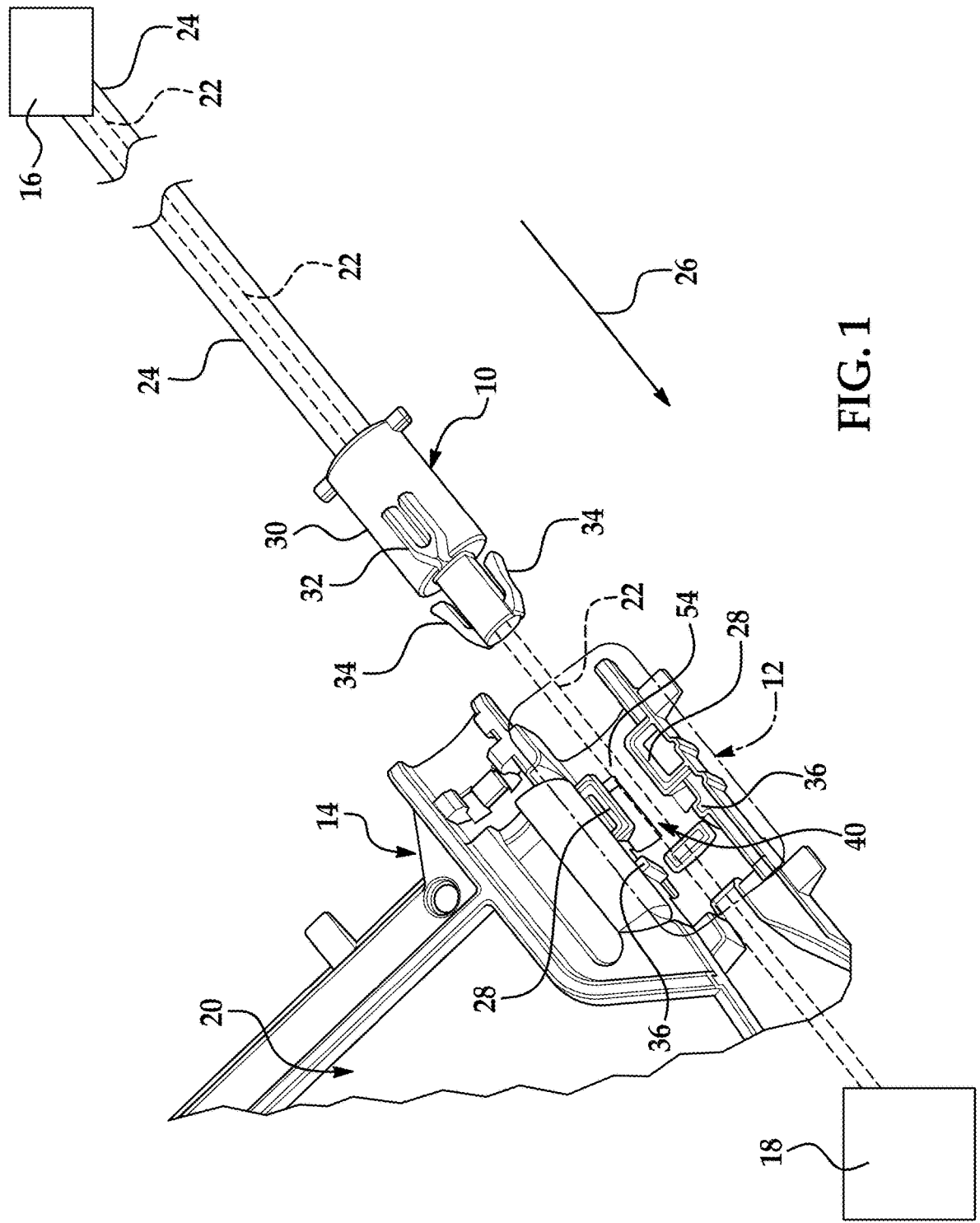
FIG. 1 is a perspective view of a portion of a latch housing including a cable abutment and a cable end configured for securement of a cable and/or cable sheath to the latch housing.
Figure 2:
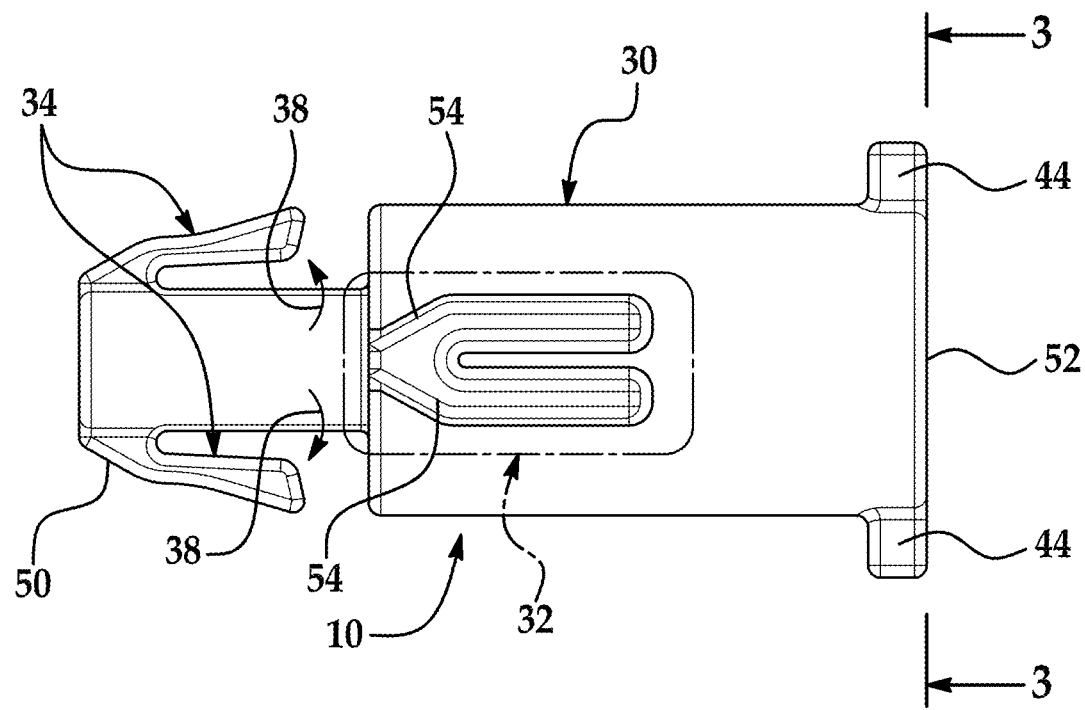
FIG. 2 is side view of the cable end fitting according to an embodiment of the present invention.
Figure 3:
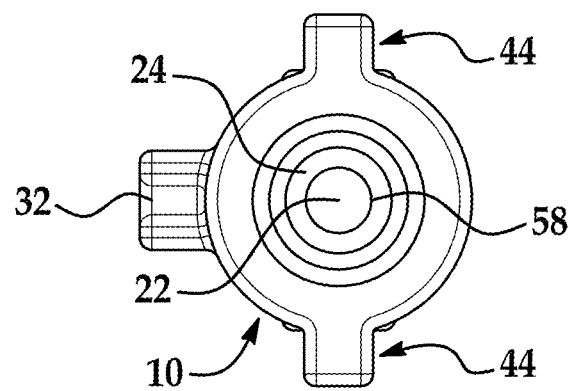
FIG. 3 is a view along lines 3-3 of FIG. 2.

Referring now to the attached FIGS. a cable conduit end, conduit end, cable end fitting or cable attachment end 10 is illustrated. The cable conduit end 10 is configured to be snap-fittingly inserted into a cable abutment 12, which in one embodiment may be a portion of a latch housing 14. In one embodiment, the latch housing 14 may be a portion of a vehicle latch that is operated by an inside release handle or outside release handle 16 that is operatively coupled to a portion 18 (illustrated schematically) of the latch 20 via a cable 22 that is slidably received within a cable sheath 24 and the cable conduit end 10. The cable 22 and cable sheath 24 are formed from flexible materials and the cable 22 is capable of transmitting a pulling or pushing force. In one non-limiting embodiment and as is known in the related arts, the cable 22 and cable sheath 24 may be collectively referred to as a Bowden cable. In FIG. 1, the cable conduit end 10 is shown as not being attached to housing 14 yet. In one embodiment, the cable conduit end may be formed out of an easily molded material such as plastic.

In order to secure the cable conduit end 10 to the housing 14, the cable conduit end 10 is inserted into the housing 14 in the direction of arrow 26. The cable conduit end 10 is configured to be secured thereto via a low insertion effort while having a high retention valve. In order to do this, the cable conduit end 10 and the latch cable abutment 12 are configured to accept a linear load geometry. That is, the cable conduit end 10 can be loaded in the axial and radial directions of the cable 22 without causing removal from the housing 14.

With the proposed geometry, the retention value of the conduit end 10 can be drastically increased without sacrificing the desirability of a low insertion effort. In order to do so, retaining features 28 were added to the cable abutment 12 in order to keep a barrel or housing 30 of the conduit end 10 securely fastened to the latch housing 14.

In addition, an alignment feature 32 is incorporated into a surface of the housing 30 of the conduit end 10 in order to properly direct the conduit end 10 into the correct orientation when it is being inserted into housing 12 in the direction of arrow 26. With the conduit end 10 in the proper orientation, two flexible retention features 34 integrated into the conduit end 10, will align with and engage the respective retention features 36 incorporated into the latch housing cable abutment 14.

Figure 4:
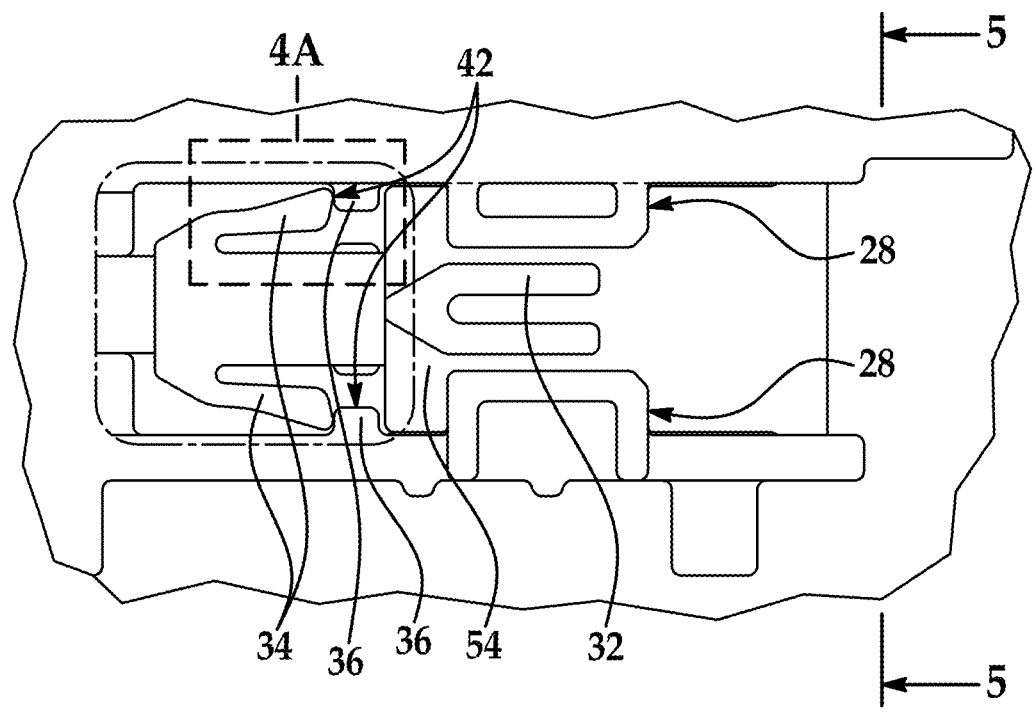
FIG. 4 is a view illustrating the cable end fitting secured to the cable abutment of the latch housing.
Figure 4A:
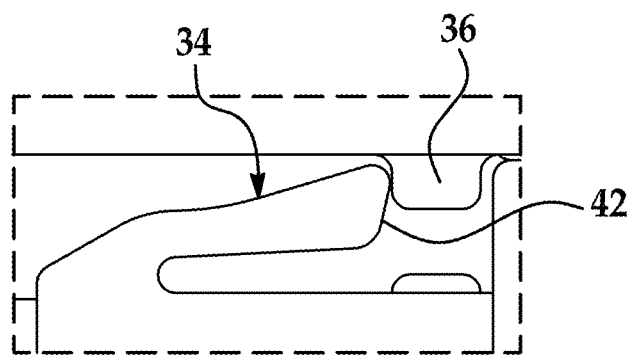
FIG. 4A is an enlarged view of a portion of FIG. 4, wherein the cable anchor is secured to cable abutment and the retention features of the cable anchor are in contact with features of the cable abutment.

In one embodiment, the flexible retention features 34 are formed from a resilient material such as plastic or equivalents thereof and are spring biased in the direction of arrows 38 into the positions illustrated in at least FIGS. 1, 2, 4, 4A and 4B. For example, the flexible retention features 34 and feature 32 may be integrally formed with conduit end 10. As the conduit end 10 is inserted into an opening 40 of the latch housing cable abutment 14, these flexible, snap-in features 34 will deflect inwardly against the biasing force of arrows 38 towards a center of the conduit end 10. Accordingly and during assembly of conduit end 10 to opening 40 of the cable abutment 14 the deflection of these features inwardly allow for a low insertion effort. Once the conduit end 10 is fully inserted these features will spring back in the direction of arrows 38 to the position or first position illustrated in at least FIGS. 1, 2, 4, 4A and 4B. At this point and as illustrated in FIGS. 4 and 4A, a distal end 42 of the features 34 engages a respective one of retaining features 36.

Once engaged, an abusive axial pull-out force on the conduit end in a direction opposite to arrow 26 will be managed by the geometry of the flexible features 34. Abusive loads will translate into compressive column loading of these features 34 and they will be able to withstand excessive loading from abusive cable forces. Furthermore, the geometry of the retention features 36 and the latch housing cable abutment interface is such that if abusive loading occurs, the engagement at this interface will be locked in, further assuring engagement.

Figure 4B:
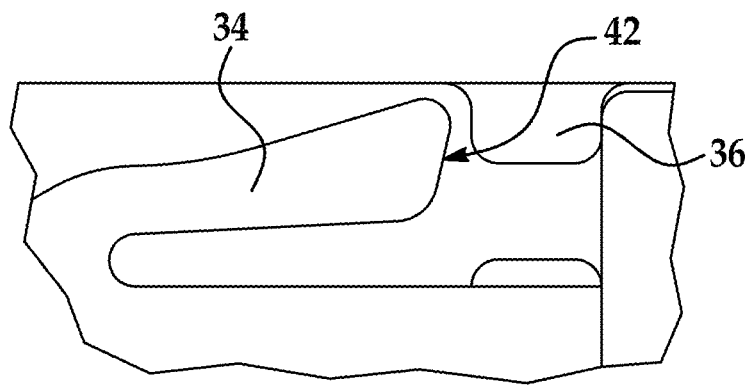
FIG. 4B is an enlarged view of a portion of FIG. 4, wherein the cable anchor is secured to cable abutment and the retention features of the cable anchor are spaced from the features of the cable abutment.
Figure 5:
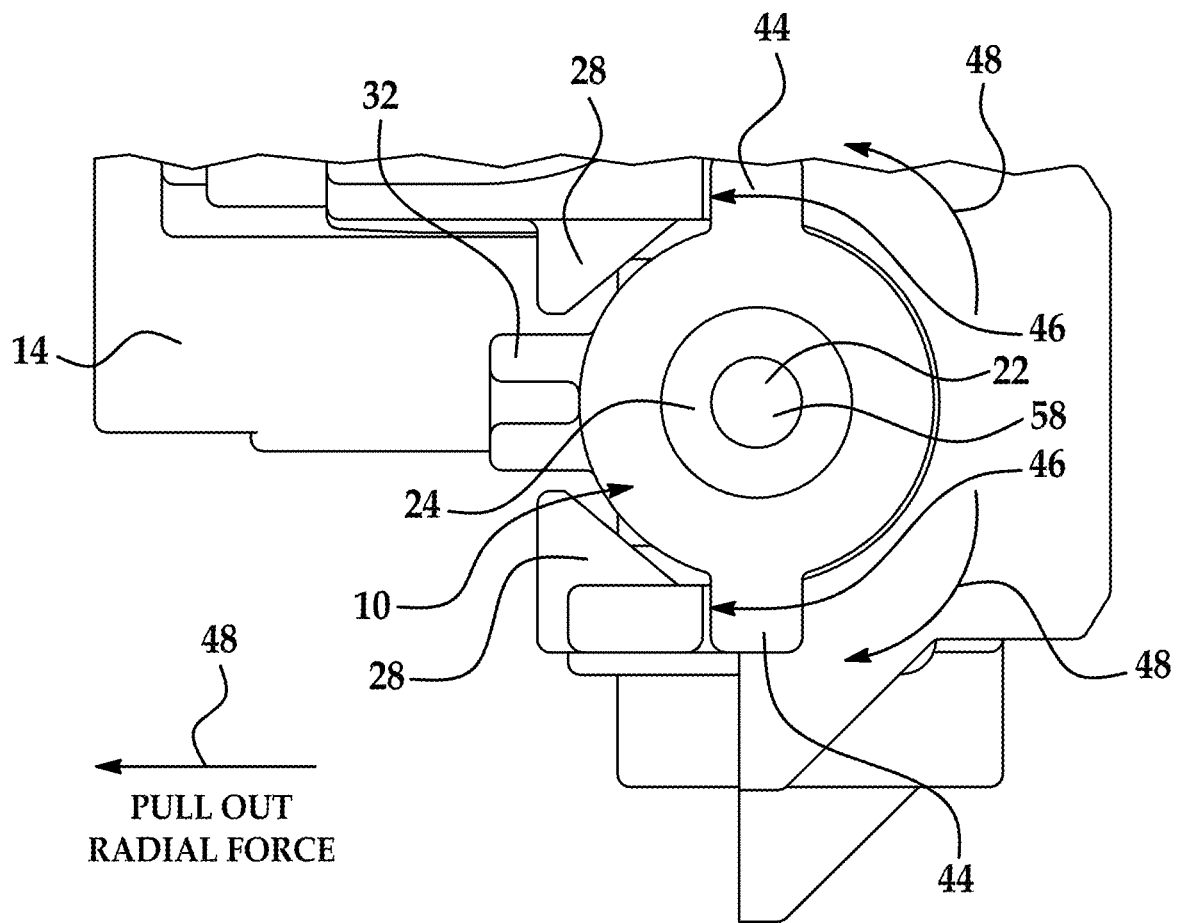
FIG. 5 is a view along lines 5-5 of FIG. 4.

FIG. 4B illustrates when the distal end 42 of feature 34 has passed retention feature 36 as it has been inserted into opening 40 such that a small gap is present between distal end 42 and feature 36. This gap will be removed once a force is applied to the cable end 10 in a direction opposite to arrow 26.

The conduit end 10 further comprises a pair of radial retention features 44, which are configured to engage features 46 of the cable abutment 14, when the conduit end 10 is inserted into opening 40. This engagement of these features will prevent the conduit end 10 from being pulled out of the abutment 14 by resisting radial forces in the direction of arrows 48. Although only two features 44 and 46 are illustrated it is, of course, contemplated that more than two features 44 and 46 or only a single feature 44, 46 may be employed in various embodiments of the present invention. Feature 32 is also located between features 28 and thus will also prevent radial forces in the directions of arrows 48 from removing the conduit end 10 from the cable abutment housing 14.

Here abusive radial loads will be managed by the retaining features 28 and 46 and the radial retention features 44 as well as feature 32. Through the use of these features abusive radial forces will be translated into beam shear loading of these features.

In one embodiment, the flexible retention features 34 are located proximate to a first or forward end 50 of the conduit end 10 and the radial retention features 44 are located at a second or rearward end 52 of the conduit end 10. Also shown is that in one embodiment, feature 32 may be configured to have angled surfaces 54 that are configured to align feature 32 with an opening 56 located between features 28 as the conduit end 10 is inserted in the direction of arrow 26 into opening 40.

Conduit end 10 also has a passage 58 extending therethrough to allow cable 22 to pass through and sheath 24 is also secured to the second or rearward end 52 by any suitable process such as crimping, insert molding, etc.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of securing a cable conduit end to a cable abutment of a vehicle latch housing, comprising:
   inserting a housing of the cable conduit end into an opening of the cable abutment of the vehicle latch housing;
   guiding an alignment feature incorporated into a surface of the housing of the cable conduit end between a pair of features located in the opening of the cable abutment;
   deflecting a pair of flexible retention features integrally formed with the conduit end towards the housing of the cable conduit end as the cable conduit end is inserted into the cable abutment;
   engaging a pair of retention features of the cable abutment with a distal end of the pair of flexible retention features after the pair of flexible retention features have been deflected towards the housing and then returned to a first position, wherein the pair of flexible retention features are spring biased away from the housing of the cable conduit end to the first position; and
   engaging a pair of features of the cable abutment with a pair of radial retention features extending outwardly away from the housing of the cable conduit end, wherein the pair of flexible retention features are located proximate to a first end of the housing of the cable conduit end and the pair of radial retention features are located proximate to a second end of the housing of the cable conduit end and the alignment feature is located between the pair of flexible retention features and the pair of retention features.

2. The method as in claim 1, wherein a cable extends through an opening in the cable conduit end.

3. The method as in claim 2, wherein a cable sheath extends over a portion of the cable and is secured to the second end of the housing of the cable conduit end.

4. The method in claim 1, wherein the pair of flexible retention features are formed from a resilient material.

5. The method as in claim 1, wherein the pair of flexible retention features are formed from plastic.

6. The method as in claim 1, wherein the alignment feature has angled surfaces.

7. The method as in claim 1, wherein the housing of the cable conduit end has a first cylindrical portion having a first diameter, and a second portion secured to the first cylindrical portion, the second portion having a length and a width wherein the length extends away from the second portion and the width is smaller than the first diameter and the alignment feature is located on the first cylindrical portion and the pair of flexible retention features extend from the second portion, and wherein the radial retention feature extends outwardly away from the first cylindrical portion, and wherein the alignment feature is located between the radial retention feature and the pair of flexible retention features.

8. The method as in claim 7, wherein a cable extends through an opening in the cable conduit end.

9. The method as in claim 8, wherein a cable sheath extends over a portion of the cable and is secured to the second end of the housing of the cable conduit end.

10. The method in claim 7, wherein the pair of flexible retention features are formed from a resilient material.

11. The method as in claim 7, wherein the pair of flexible retention features are formed from plastic.

12. The method as in claim 7, wherein the alignment feature has angled surfaces.

\* \* \* \* \*